United States Patent
Thorsén et al.

(10) Patent No.: US 10,560,392 B2
(45) Date of Patent: Feb. 11, 2020

(54) WIRELESS COMMUNICATION ARRANGEMENT WITH TWO DEVICES COMMUNICATING WITH EACH OTHER VIA A RADIO LINK IN WHICH A COMMON RADIO INTERFACE CONSTITUTES A COMMUNICATION PROTOCOL FOR DATA STREAMS ARRANGED TO SUPPORT A SEGMENTATION OF DATA FRAMES

(71) Applicant: Telefonaktiebolaget LM Ericsson (publ), Stockholm (SE)

(72) Inventors: Per-Arne Thorsén, Öjersjö (SE); Håkan Grenabo, Floda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 56 days.

(21) Appl. No.: 15/579,468

(22) PCT Filed: Jul. 8, 2015

(86) PCT No.: PCT/EP2015/065630
§ 371 (c)(1),
(2) Date: Dec. 4, 2017

(87) PCT Pub. No.: WO2017/005324
PCT Pub. Date: Jan. 12, 2017

(65) Prior Publication Data
US 2018/0152388 A1    May 31, 2018

(51) Int. Cl.
*H04L 12/823* (2013.01)
*H04B 7/26* (2006.01)
(Continued)

(52) U.S. Cl.
CPC .......... *H04L 47/32* (2013.01); *H04B 7/2656* (2013.01); *H04L 43/0882* (2013.01);
(Continued)

(58) Field of Classification Search
CPC . H04L 47/32; H04L 43/0882; H04W 28/0231
(Continued)

(56) References Cited

U.S. PATENT DOCUMENTS

| 2008/0069032 A1 | 3/2008 | Liu |
| 2011/0103494 A1 | 5/2011 | Ahmadi |

(Continued)

FOREIGN PATENT DOCUMENTS

| RU | 2012122823 A | 12/2013 |
| WO | 2009010973 A1 | 1/2009 |

(Continued)

*Primary Examiner* — Iqbal Zaidi
(74) *Attorney, Agent, or Firm* — Coats & Bennett, PLLC

(57) ABSTRACT

The present disclosure relates to a wireless communication arrangement (1) comprising a first device (2) and a second device (3) that are arranged to communicate with each other via a radio link (4). The first device (2) comprises a first device first part (5) and at least one first device second part (6, 7), and the second device (3) comprises a second device first part (8) and at least one second device second part (9, 10). Each second part (6, 7; 9, 10) comprises a corresponding antenna arrangement (11, 12; 13, 14), and a common radio interface (15a, 15b) (CRI) constitutes a communication protocol for data streams between said first part (5, 8) and each of said second part (6, 7; 9, 10) for each device (2, 3). The CRI (15a, 15b) is arranged to support a segmentation of data frames (20), where formed data segments (21) each comprises at least a part of a data frame (20).

27 Claims, 6 Drawing Sheets

(51) Int. Cl.
   *H04L 12/26*      (2006.01)
   *H04L 12/861*     (2013.01)
   *H04L 29/06*      (2006.01)

(52) U.S. Cl.
   CPC .............. *H04L 43/16* (2013.01); *H04L 49/90* (2013.01); *H04L 69/22* (2013.01)

(58) Field of Classification Search
   USPC .................................................. 370/252–339
   See application file for complete search history.

(56) References Cited

U.S. PATENT DOCUMENTS

2016/0183248 A1* 6/2016 Niu ...................... H04B 7/0413
                                                                  370/329
2019/0114549 A1* 4/2019 Olsher .................... G06N 5/04

FOREIGN PATENT DOCUMENTS

WO       2011026508 A1    3/2011
WO    WO-2011026508 A1 *  3/2011  ............ H04W 28/08

* cited by examiner

WIRELESS COMMUNICATION ARRANGEMENT WITH TWO DEVICES COMMUNICATING WITH EACH OTHER VIA A RADIO LINK IN WHICH A COMMON RADIO INTERFACE CONSTITUTES A COMMUNICATION PROTOCOL FOR DATA STREAMS ARRANGED TO SUPPORT A SEGMENTATION OF DATA FRAMES

TECHNICAL FIELD

The present disclosure relates to a wireless communication arrangement comprising a radio interface for communication between a first device and a second device that are arranged to communicate with each other via a radio link.

BACKGROUND

For radio links, it is common to have packet domain and a radio link domain, where the radio link domain comprises the microwave radio and the antenna. The packet domain may be configured as an indoor part, and the radio link domain may be configured as an outdoor part.

Bonding means that different parts of the traffic are conveyed over different links and reassembled when received. If the links have different rates, the delays are different implying buffering before reassembly when waiting the subsequent parts of data to arrive over slower links. The link speed may also change arbitrarily between links due to e.g. different susceptibility to external conditions for different carrier frequencies. Buffering is therefore often centralized and need to be dimensioned for the worst use case.

Microwave hop protection means that at least two antennas are used to receive the same signal, transmitted from at least one transmitter. The received signal quality in different antennas may vary due to varying channel conditions over time, space and frequency. By selecting the best signal or combining signals from several antennas the hop becomes less susceptible to disturbances.

Bonding and protection are functions often configured together but implemented as different functions and at different protocol layer. This implies careful and thorough dimensioning and configuration of the system. Configuration often also becomes less intuitive.

Furthermore, bonding schemes create an overhead for bookkeeping since it is necessary to know the order of the part of data conveyed over different links when reassembling them. There are also tradeoffs to be made between e.g. buffering resources and segment size. For example, small segments reduce buffering requirements but increases overhead. The above is especially apparent when there is no bonding at all in 1+0 links (without protection). Often separate schemes are developed for this case and it is regarded as an exception when it really is the main use case.

Adding bookkeeping overhead as prefixes to data segments requires the complete segment to be buffered and analyzed before transmitted if the prefix contains references to data content. This creates additional store and forward delays in a system.

A QoS (Quality of Service) function in the packet domain is arranged to delete packets based on quality labeling when there is insufficient capacity over the links, where the insufficient capacity in this example is due to a certain data rate limitation in the radio link domain which then constitutes a so-called bottleneck. In order to support best operation of this function, it is important to minimize buffering between the QoS function and the present capacity bottleneck, since that may result in low priority packets being buffered in the radio link domain. When this buffer becomes filled, the QoS function is forced to delete high priority packets. When many radio links are bonded, this problem occurs since some buffering is necessary due to reordering emerging from rate differences, but that buffering often becomes unnecessarily large due to the latency introduced by long turn around times between packet and radio link domains.

In radio links, delays may vary with the momentary rate. This implies a problem when wanting to delay data for a certain time to compensate for rate differences in bonded hops.

It is therefore desired to provide an enhanced configuration of different devices in a wireless communication arrangement such as a radio link, and enhanced interface functionality between these devices.

SUMMARY

It is an object of the present disclosure to provide an enhanced configuration of different devices in a wireless communication arrangement, and an enhanced interface functionality between these devices.

Said object is obtained by means of a wireless communication arrangement comprising a first device and a second device that are arranged to communicate with each other via a radio link. The first device comprises a first device first part and at least one first device second part, and the second device comprises a second device first part and at least one second device second part. Each second part comprises a corresponding antenna arrangement, and a common radio interface (CRI) constitutes a communication protocol for data streams between said first part and each of said second part for each device. The CRI is arranged to support a segmentation of data frames, where formed data segments each comprises at least a part of a data frame.

Said object is also obtained by means of a method in a wireless communication arrangement using a first device and a second device that are used to communicate with each other via a radio link. The first device uses a first device first part and at least one first device second part, and the second device uses a second device first part and at least one second device second part. The method comprises using a common radio interface (CRI) that constitutes a communication protocol for data streams between said first part and each of said second part for each device 2, 3. the method also comprises performing segmentation of data frames, such that data segments are formed, each data segment comprising at least a part of a data frame.

According to an example, said second device first part comprises a data restoration unit that is arranged to at least partly restore received data that is transmitted from at least one first device second part to at least two second device second parts.

According to another example, the CRI is arranged to support an initial addition of segment header/flag data that comprises information regarding segment restoring, and an at least partial removal of said segment header/flag data for at least a plurality of data segments 21 before transmission to at least one second device second part.

According to another example, the CRI is arranged to support segmentation of data frames 20 in dependence of estimated radio link rate capacity.

According to another example, at least one device comprises a second part that comprises a second part data stream buffer. At least one first device second part is arranged to transmit data to at least one second device second part at a certain time that is known to both said first device second part and said first device first part.

According to another example, at least one device comprises a first part that comprises a first part data stream buffer and a second part data stream buffer. At least one control unit arranged to control the first part data stream buffer to release data to said second part data stream buffer at a rate that lies between an upper threshold and a lower threshold at said second part data stream buffer.

According to another example, the CRI is arranged to control routing of data streams to a desired first device second part in dependence of available radio link rate capacity.

According to another example, the first device and the second device have a reciprocal functionality, and may for example be in the form of wireless communication nodes.

More examples are disclosed in the dependent claims.

A number of advantages are obtained by means of the present disclosure. Mainly, an enhanced configuration of different devices in a radio link communication system as well as an enhanced interface functionality between these devices is obtained.

BRIEF DESCRIPTION OF THE DRAWINGS

The present disclosure will now be described more in detail with reference to the appended drawings, where.

DETAILED DESCRIPTION

Figure 1:
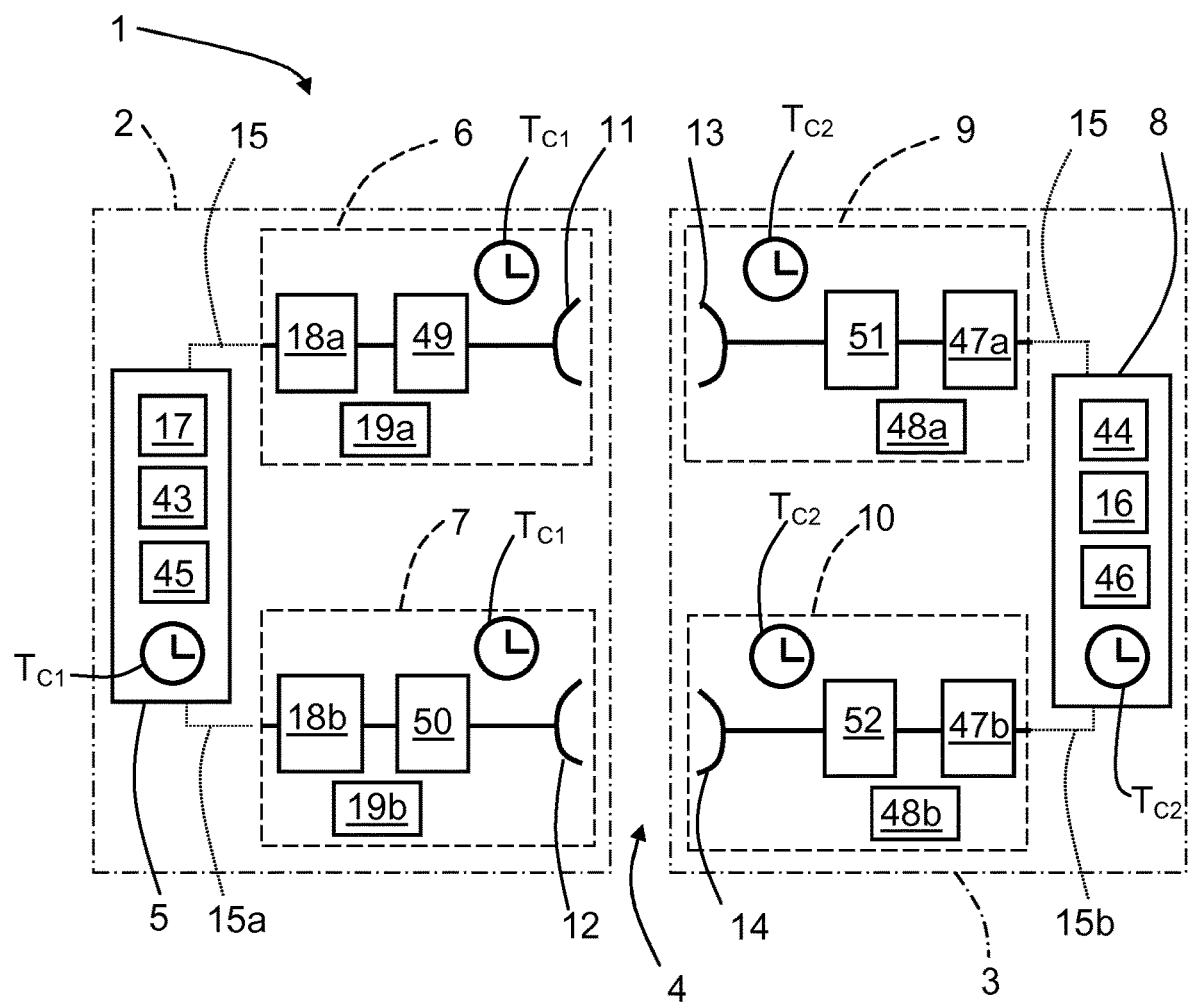
FIG. 1 shows a first schematic view of a wireless communication arrangement with a first node and a second node.

With reference to FIG. 1, a schematic view of a wireless communication arrangement 1 is shown. The wireless communication arrangement 1 comprises a first node 2 which in turn comprises a first node indoor unit 5 that is part of a packet domain, where the first node indoor unit 5 is in the form of a network forwarding device. The node also comprises a first node first outdoor unit 6 and a first node second outdoor unit 7, where each first node outdoor unit 6, 7 is part of a radio link domain and comprises an RF (Radio Frequency) radio 49, 50 and a microwave antenna 11, 12. Between these domains, digital data streams are transferred by means via an interface 15a that comprises distributing precision timing protocols. Each RF radio 49, 50 contains all analogue and digital signal processing, while the first node indoor unit 5 contains network related functionality and radio layer support functionality such as so-called N+0 and 1+1 management; these terms will be discussed more in detail later.

The wireless communication arrangement 1 further comprises a second node 3 which in turn comprises a second node indoor unit 8, a second node first outdoor unit 9 and a second node second outdoor unit 10, where these units have a functionality that corresponds to those of the first node, such as RF radios 51, 52, microwave antennas 13, 14 and interface 15b. The nodes 2, 3 are arranged to communicate with each other via a radio link 4.

1+0 means that there is no protection, and 1+1 means that there is protection. Simplified, protection means that one outdoor unit transmits the same data to two or more receiving outdoor units at other nodes, for example if the first node first outdoor unit transmits 6 the same data to the second node first outdoor unit 9 and to the second node second outdoor unit 10. Both second node outdoor units 9, 10 thus receive the same data and forward this data to the second node indoor unit 8 with attached quality info. The second node indoor unit 8 aligns the received data and selects those data frames with the best quality.

Another term in this context is bonding, where bonding means that different parts of the traffic are conveyed over different links and reassembled when received. If the links have different rates, the delays are different implying buffering before reassembly when waiting the subsequent parts of data to arrive over slower links.

Generally, in N+M systems, the capacity of N links are protected by M links where generally M<N. Several configurations are possible, including but not limited to the following examples. N active transmitters and N+M active receivers, where each of the M protecting receivers either may have a fixed allocation to a specific link or there may be a dynamic allocation of any of the M links to any of the N links. Other schemes also exist where e.g. any of the M links is possible to allocate only to a separate subset of the N links. Other N+M schemes may also use N+M active transmitters where the M protecting links operate at other frequencies or use some other discriminating characteristic of the radio channel to avoid interfering with the N protected links.

The criteria for selecting a specific scheme for protection of course depend on cost, complexity and the channel characteristics. In addition to that, also the type of hosted traffic affects how protection is designed. For packet traffic e.g. there is often a centralized function for prioritization, meaning that a varying rate of aggregated capacity can be tolerated. In that case, a certain protection is achieved also with no dedicated protecting links.

Several different criteria may be used for dynamic allocation of the protecting links, including but not limited to Radio Signal Strength and Signal to Noise Ratio.

According to the present disclosure, a common radio interface 15a, 15b (CRI) constitutes a communication protocol for data streams between each indoor unit 5, 8 and the corresponding outdoor units 6, 7; 9, 10. This means that the first node indoor unit 5 is directly connected to each one of the first node first outdoor unit 6 and the first node second outdoor unit 7, and is arranged to communicate with these outdoor units via the CRI 15a, 15b. Correspondingly, the second node indoor unit 8 is directly connected to each one of the second node first outdoor unit 9 and the second node second outdoor unit 10, and is arranged to communicate with these outdoor units via the CRI 15a, 15b. The CRI is a digital interface where for example an Ethernet MAC layer IEEE 802.1Q may be used as a CRI link layer.

In the continuing description, transmission of data streams from the first node 2 to the second node 3 will be described, and it is understood that data streams also may be transmitted from the second node 3 to the first node 2 in a corresponding manner if the nodes 2, 3 are equipped for such functionality, which is intended in this example. All parts mentioned for transmission and reception are indicated at both nodes for the sake of completeness.

Figure 2:
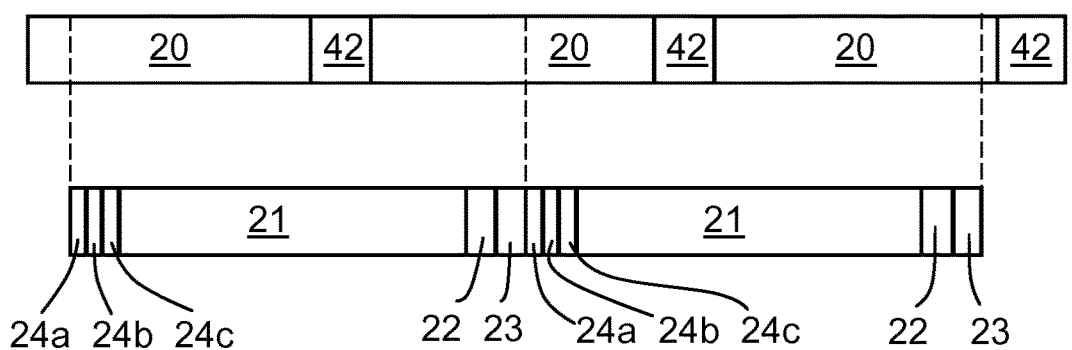
FIG. 2 shows segmentation of data frames.

With reference to FIG. 2, the digital data that is to be transmitted is in the form of data frames 20 with attached payload framing 42. The CRI 15a, 15b is arranged to support a segmentation of data frames 20, where each formed data segment 21 comprises at least a part of a data frame 20. More specifically, a data segment is created by placing the data frames 20 with attached payload framing 42 in a continuous stream and then dividing the stream into segments 21. The segmentation is thus independent of packet framing. A segment end header 23 and other types of segment flags and/or segment data 22, 24a, 24b, 24c are added to each data segment 21, where each segment end header 23 is positioned after the rest of the segment data for each segment 21. The data stream is thus divided into segments with a size suitable for distribution on multiple physical channels. A time stamp is recorded when each segment is generated.

A first part of segment data 24a, 24b, 24c comprises information regarding segment length 24a, the time stamp 24b as well as a sequential number data 24c and is positioned at the beginning of each segment 21. All of the segment end header 23 and other types of segment flags and/or segment data 22, 24a, 24b, 24c are added in certain steps and some of these are later removed before transmission at a compression step as will be discussed later. The second node indoor unit 8 comprises a data restoration unit 16 that is arranged to at least partly restore received data, where at least one segment flag 22 that has been added, and not has been removed later at the compression step, comprises information regarding segment restoring. The CRI 15a, 15b thus is arranged to support an initial addition of segment header/flag data 22, 23, 24a, 24b, 24c, where at least one segment flag 22 comprises information regarding segment restoring. The first node indoor unit 5 comprises a corresponding data restoration unit 45.

According to an example, data segments 21 have a fixed maximum size. As long as the data rate is maintained at the maximum air interface capacity, all segments will have the maximum size and maximum efficiency is achieved. If the data rate is lower, there will be gaps in the transmission, and when there is not enough data to fill a maximum size segment a shorter segment shall be generated. According to an example, no idle information is thus to be inserted. To minimize overhead, the segmentation procedure should have a certain look-ahead to favor maximum size segments, in other words the CRI 15a, 15b is arranged to support segmentation of data frames 20 in dependence of estimated radio link rate capacity.

The maximum segment size depends on the RF channel spacing and is a trade-off between the protocol overhead and the delay variation introduced. The segment size including segment header may for example be selected according to the following table:

| Spacing [MHz] | Segment size [Bytes] |
|---|---|
| 7 | 128 |
| 14 | 128 |
| 28 | 256 |
| 56 | 512 |
| 112 | 512 |

For any other channel spacing, the closest number should be selected. For configurations where channels with different spacing are bonded together, the narrowest channel should determine the segment size to use.

The CRI 15a, 15b may for example carry the following information:
Device control of the outdoor units.
Traffic
  The DCN (Data Communication Network) is assumed to be carried in-band and is transparent to the CRI.
  In the TX direction, back pressure is applied to make the air interface capacity visible to QoS (Quality of Service) management function in the indoor unit.
  Support for protection schemes with errorless switching including N+0 configurations and 1+1 configurations.
Synchronization
  Frequency synchronization supported in physical layer.
  Support for IEEE1588-2008 transparent clocking.

In the following an overview of the procedure for preparing a data stream for transmission after completed segmentation will be described.

Segments are distributed to the available outdoor units, here the first node first outdoor unit and the second node outdoor unit. Generally, the distribution handles N+M configurations. In a scenario where multiple radios contribute to the same network connection, traffic is distributed segment by segment. The distribution is driven by back pressure from the channels. When a channel is open for transmission, it can accept at least one full segment. As segments can be transmitted via several parallel paths potentially operating at different speed, segments will normally arrive at the receiver out of order. They must therefore be placed in the correct order before further processing. Further, when N+M or 1+1 protection is used, multiple copies of the same segment can be received; in this case the segment with the highest quality shall be used. The second node indoor unit 8 may for example be arranged to align the received data and select those data segments with the best quality, and performing re-assembly via a re-assembly buffer using a MSE (Mean Square Error) algorithm by means of the data restoration unit 16.

With N+M and 1+1 protection, the reordering procedure requires a time window when multiple copies of the same data are allowed. In N+0 configurations, segments can be forwarded as soon as they are in sequence. In all cases a timeout is necessary to judge when a segment has been lost.

Different headers, for example CRI traffic and Ethernet MAC (Media Access Control) headers (not shown) are attached to each data segment for transmission to outdoor unit(s) in question. The timestamp may be inserted in the CRI traffic header. Flow control from the outdoor unit controls the rate at which the segments are passed to the next block. Flow control will be described more in detail below.

At the segment compression, overhead data considered unnecessary is removed. For example, the CRI is arranged to support an at least partial removal of said segment header/flag data 22, 23, 24$a$, 24$b$, 24$c$ for at least a plurality of data segments 21 before transmission to at least one second node outdoor unit 9, 10.

The removal may for example comprise removal of the segment length 24$a$, the time stamp 24$b$, sequential number data 24$c$ and/or a segment end header 23 for at least two consecutive data segments 21, some examples will be provided below.

As shown in FIG. 2, a removed sequential number data 24$c$ is first exchanged with sequential number difference data 25. Furthermore, the sequential number difference data 25 is also removed while the sequential number difference is determined to be constant for at least two consecutive data segments 21.

Figure 3:
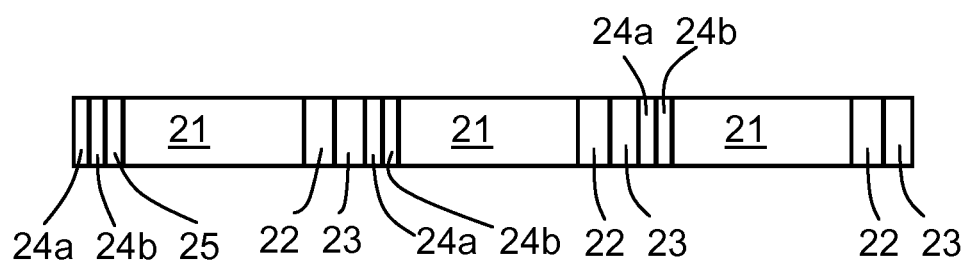
FIG. 3 shows a first example of overhead reduction for data segments.
Figure 4:
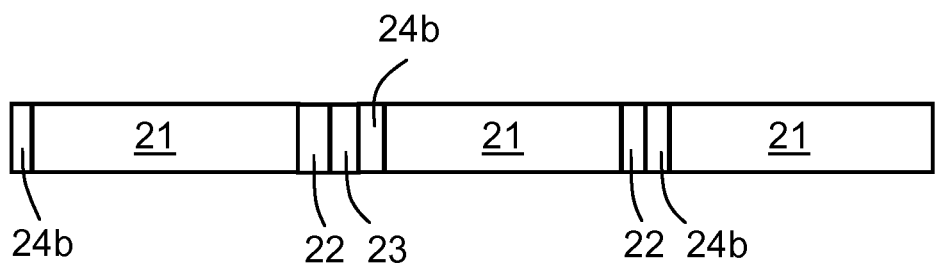
FIG. 4 shows a second example of overhead reduction for data segments.

As shown in FIG. 3, where the sequential number difference data 25 is determined to be removed, the segment length 24$a$ is also removed since each segment end header 23 specifies the end of the segment 21. Furthermore, the segment end header 23 is then removed as well while the sequence length of consecutive data segments 21 is determined to be constant. At a further stage, the time stamp 24$b$ may also be removed.

Data segments are now passed to the air interface via the first node microwave antennas. In the RX direction, basically the reverse processing takes place.

Regarding flow control, in order to minimize the frame delay variation over the radio link, the amount of data buffering is preferably minimized. As there is necessarily a delay in the flow control loop over the CRI 15$a$, 15$b$, some buffering is needed to achieve a high utilization on the radio link. The delay is caused by the time it takes to transport flow control information over the link and the time it takes for the peers to generate flow control data and react on received flow control.

The larger the difference between the link rate and the air interface capacity the more buffer space will be needed in the first node outdoor units, whereby packet delay variation is created. This may result in a low priority packets being buffered in the radio link domain. When this buffer becomes filled, a QoS function 43 that is positioned in the first node indoor unit 5 is forced to delete high priority packets that are buffered in the first node indoor unit 5. A corresponding QoS function 44 is positioned in the second node indoor unit 8.

By controlling the data rate on the CRI to match the instantaneous air interface throughput, there will be less data in transit over the link at any point in time thus reducing the impact of the delay in a dynamic backpressure loop.

With reference to FIG. 1, the first node indoor unit 5 comprises a first data stream buffer 17, the first node first outdoor unit 6 comprises a second data stream buffer 18$a$ and a first control unit 19$a$, and the first node second outdoor unit 7 comprises a third data stream buffer 18$b$ and a second control unit 19$b$. The control units 19$a$, 19$b$ are arranged to control the first data stream buffer 17 to release data to the second data stream buffer 18$a$ and third data stream buffer 18$b$ at a rate that lies between an upper threshold $t_U$ and a lower threshold $t_L$ at the second data stream buffer 18$a$ and third data stream buffer 18$b$ according to a so-called backpressure algorithm.

The control units 19$a$, 19$b$ are arranged to update the upper threshold $t_U$ and the lower threshold $t_L$ in dependence of current radio rate capacity. For example, the upper threshold $t_U$ may be controlled such that it exceeds the current radio rate capacity, and the lower threshold $t_L$ may be controlled such that it falls below the current radio rate capacity.

According to an example, the backpressure algorithm may operate in two layers, here for the first node 2:

1: The outdoor units 6, 7 monitor the number of bytes in the corresponding data stream buffer 18$a$, 18$b$. When the fill level passes above the upper threshold $t_U$, a flow control frame is sent to the indoor unit 5 with rate=Rate_low. When the fill level passes below the lower threshold $t_L$, a flow control frame is sent to the indoor unit 5 with rate=Rate_high. The outdoor units 6, 7 monitor the segment time stamps in the corresponding data stream buffer 18$a$, 18$b$. When the time stamp indicate that transmission is scheduled into the future, a flow control frame is sent to the indoor unit 5 with rate=Rate_high If the time stamp indicates that the scheduled transmission time is already passed a flow control frame is sent to the indoor unit 5 with rate=Rate_low. In this way it is possible to buffer as few segments as possible at the outdoor units 6, 7. If there are too few segments such that the transmission capacity is not fully used, the rate from the indoor unit 5 is increased such that the segments surely are present when they are due for transmission.

2: The parameters $t_U$, $t_L$, Rate_high and Rate_low are set according to the instantaneous air interface capacity. When the air interface capacity is changed, these parameters are updated accordingly.

To minimize overshoot in the buffer when the air interface rate is decreased, the data rate on the CRI may be updated before the change on the air interface is performed. The pre-warning time shall then be at least as long as the total delay of the flow control loop. When the air interface rate is increased, the CRI data rate shall then be increased after the change on the air interface has been performed.

According to another example, it is conceivable that the data stream buffer 17 at the first node indoor unit 5 is reduced or eliminated, such that more all or data buffers for data transfer are placed in the outdoor units of the transmitting node. Then the first node outdoor units 6, 7, being arranged to buffer data streams before transmission in the corresponding buffers 18$a$, 18$b$, are arranged to transmit data to the second node outdoor units 9, 10 at a certain time $T_{C1}$ that is known to both the first node indoor unit 5 and the first node outdoor units 6, 7.

Corresponding data stream buffers 46, 47$a$, 47$b$ for transmission of data, as well as corresponding control units 48$a$, 48$b$ are positioned in the second node 3 as well for the case where the second node 3 is transmitting. A corresponding certain time $T_{C2}$ exists as well.

Having data stream buffers 17, 18$a$, 18$b$; 46, 47$a$, 47$b$ for data transfer at the transmitting node reduces the need for data reception buffers at the receiving end. If more outdoor units are added, those added outdoor units should also be equipped with corresponding data stream buffers.

Figure 5:
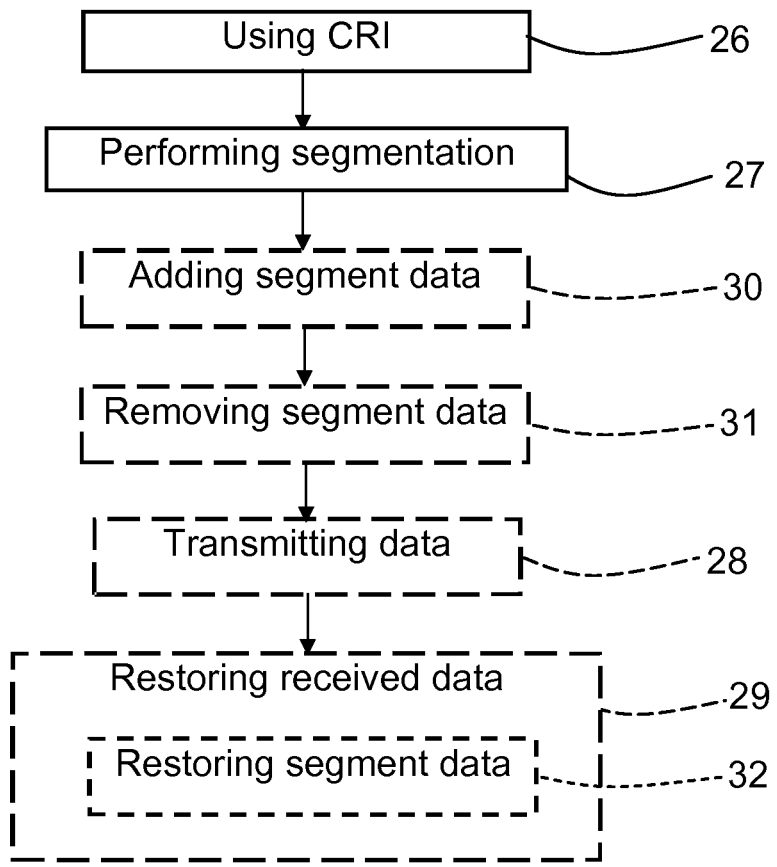
FIG. 5 shows a flowchart for a method according to the present disclosure.

With reference to FIG. 5, the present disclosure also relates to the present disclosure also relates to a method in a wireless communication arrangement 1 using a first device 2 and a second device 3 that are used to communicate with each other via a radio link 4. The first device 2 uses a first device first part 5 and at least one first device second part 6, 7, and the second device 3 uses a second device first part 8 and at least one second device second part 9, 10. The method comprises:

26: Using a common radio interface 15 (CRI) that constitutes a communication protocol for data streams between said first part 5, 8 and each of said second part 6, 7; 9, 10 for each device 2, 3.

27: Performing segmentation of data frames 20, such that data segments 21 are formed, each data segment 21 comprising at least a part of a data frame 20.

According to an example, the method comprises:

28: Transmitting data from at least one first device second part 6, 7 to at least two second device second parts 9, 10. 29: At least partly restoring received data.

According to an example, the method further comprises:

30: Initially adding segment header/flag data 22, 23, 24a, 24b, 24c that comprises information regarding segment restoring.

31: At least partially removing said segment header/flag data 22, 23, 24a, 24b, 24c for at least a plurality of data segments 21 before transmission to at least one second device second part 9, 10.

According to an example, the method further comprises:

32: At least partly restoring the removed header/flag data 22, 23, 24a, 24b, 24c.

Figure 6:
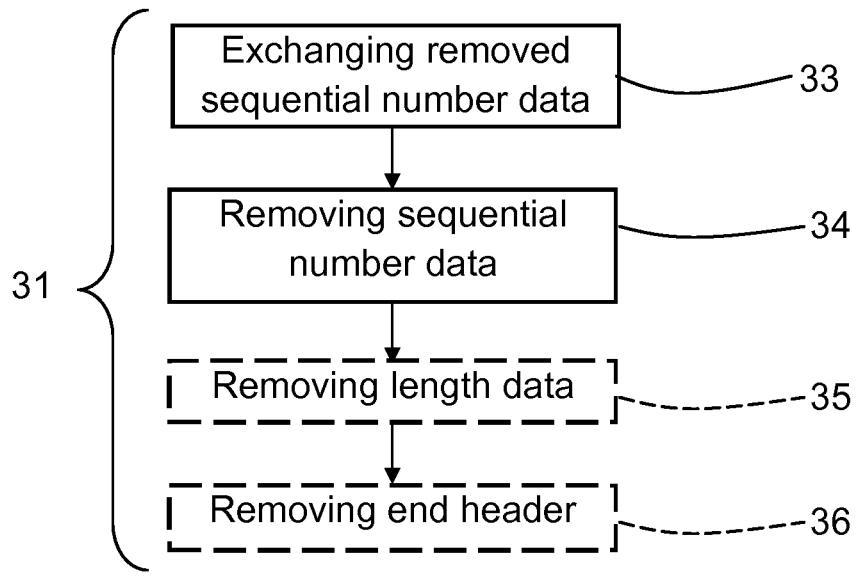
FIG. 6 shows a flowchart for a method according to an example of the present disclosure.

According to an example, with reference to FIG. 6, the step 31 of at least partially removing segment header/flag data comprises:

33: Exchanging removed sequential number data 24c with sequential number difference data 25.

34: Removing the sequential number difference data 25 while the sequential number difference is determined to be constant for at least two consecutive data segments 21.

According to a further example, the step 31 of at least partially removing segment header/flag data comprises:

35: Removing segment length data 24a.

36: Removing the segment end header 23 if the sequence length of consecutive data segments 21 is determined to be constant.

Figure 7:
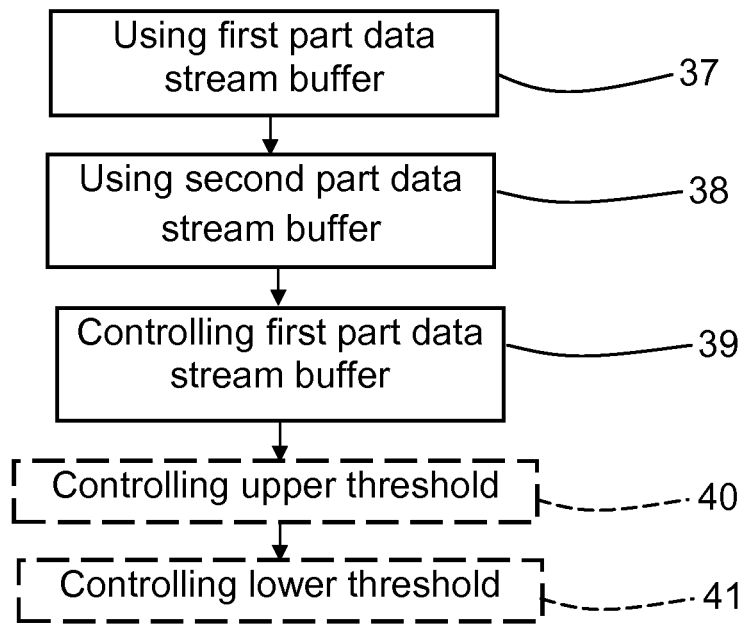
FIG. 7 shows a flowchart for a method according to another example of the present disclosure.

According to an example, with reference to FIG. 7, the method comprises:

37: Using a first part data stream buffer 17 in at least one first part 5.

38: Using a second part data stream buffer 18a, 18b in at least one second part 6, 7.

39: Controlling the first part data stream buffer 17 to release data to said second part data stream buffer 18a, 18b at a rate that lies between an upper threshold $t_U$ and a lower threshold $t_L$ at said second part data stream buffer 18a, 18b.

According to an example, the method further comprises:

40: Controlling the upper threshold $t_U$ such that it exceeds the current radio rate capacity.

41: Controlling the lower threshold $t_L$ such that it falls below the current radio rate capacity.

Figure 8:
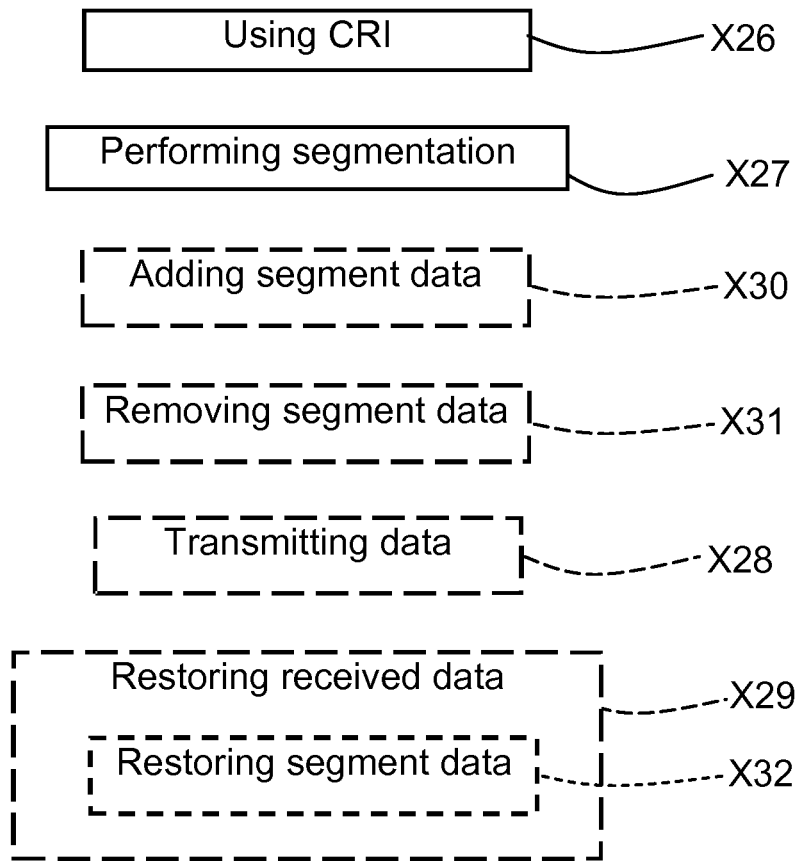
FIG. 8 illustrates a wireless communication arrangement according to some aspects of the present disclosure.

FIG. 8 shows a wireless communication arrangement having a first device 2 and a second device 3 that are used to communicate with each other via a radio link 4. The first device 2 uses a first device first part 5 and at least one first device second part 6, 7, and the second device 3 uses a second device first part 8 and at least one second device second part 9, 10. The wireless communication arrangement comprises:

A first using module X26 that is configured to use a common radio interface (CRI) that constitutes a communication protocol for data streams between said first part 5, 8 and each of said second part 6, 7; 9, 10 for each device 2, 3.

A segmentation module X27 that is configured to perform segmentation of data frames 20, such that data segments 21 are formed, each data segment 21 comprising at least a part of a data frame 20.

According to some aspects, the wireless communication arrangement further comprises:

An optional transmitting module X28 that is configured to transmit data from at least one first device second part 6, 7 to at least two second device second parts 9, 10.

An optional first restoring module X29 that is configured to at least partly restore received data.

According to some aspects, the wireless communication arrangement further comprises:

An optional adding module X30 that is configured to initially add segment header/flag data 22, 23, 24a, 24b, 24c that comprises information regarding segment restoring.

An optional first removing module X31 that is configured to at least partially remove said segment header/flag data 22, 23, 24a, 24b, 24c for at least a plurality of data segments 21 before transmission to at least one second device second part 9, 10.

According to some aspects, the wireless communication arrangement further comprises an optional second restoring module X32 that is configured to at least partly restore the removed header/flag data 22, 23, 24a, 24b, 24c.

Figure 9:
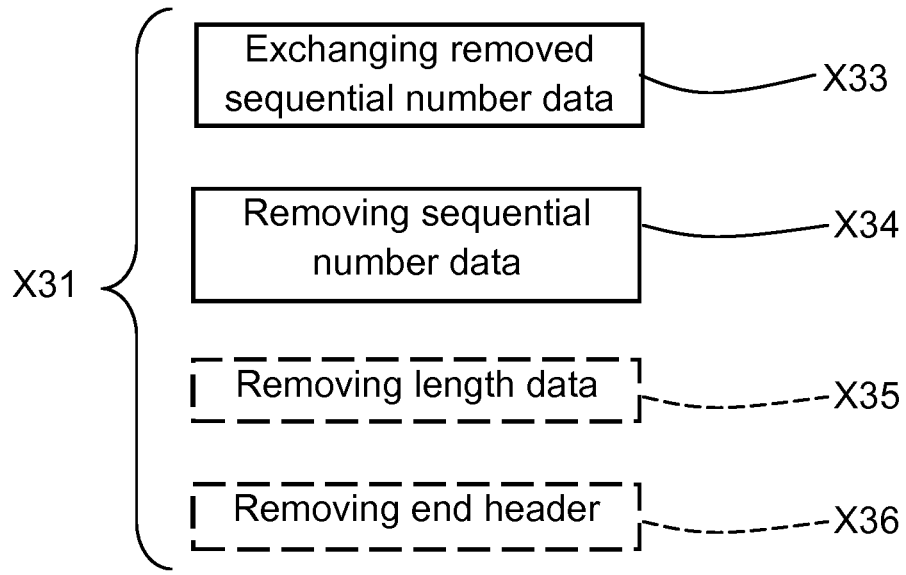
FIG. 9 illustrates a wireless communication arrangement according to some aspects of the present disclosure.

According to some aspects, with reference to FIG. 9, the optional first removing module X31 comprises:

An optional exchanging module X33 that is configured to exchange removed sequential number data 24c with sequential number difference data 25.

An optional second removing module X34 that is configured to remove the sequential number difference data 25 while the sequential number difference is determined to be constant for at least two consecutive data segments 21.

According to some aspects, the optional first removing module X31 further comprises:

An optional third removing module X35 that is configured to remove segment length data 24a.

An optional fourth removing module X36 that is configured to remove the segment end header 23 if the sequence length of consecutive data segments 21 is determined to be constant.

Figure 10:
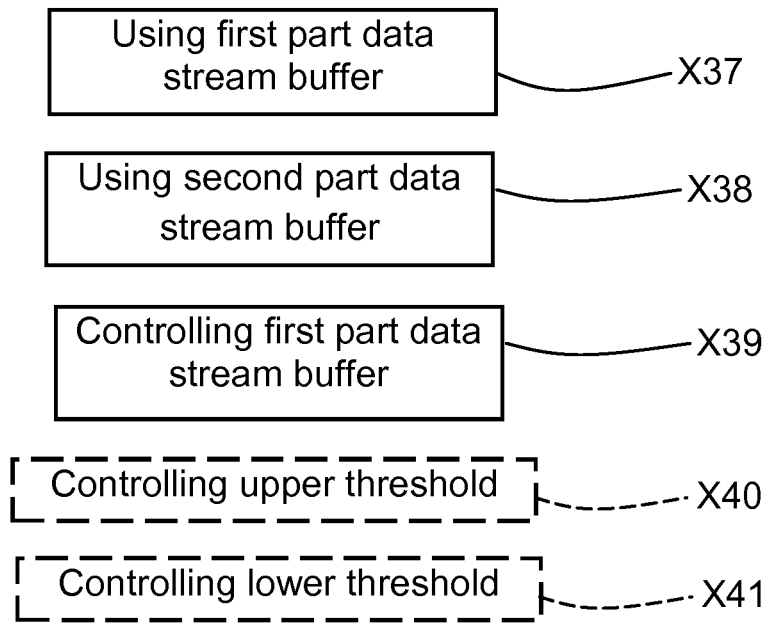
FIG. 10 illustrates a wireless communication arrangement according to some aspects of the present disclosure.

According to some aspects, with reference to FIG. 10, the wireless communication arrangement further comprises:

An optional second using module X37 that is configured to use a first part data stream buffer 17 in at least one first part 5.

An optional third using module X38 that is configured to use a second part data stream buffer 18a, 18b in at least one second part 6, 7.

An optional first controlling module X39 that is configured to control the first part data stream buffer 17 to release data to said second part data stream buffer 18a, 18b at a rate that lies between an upper threshold $t_U$ and a lower threshold $t_L$ at said second part data stream buffer 18a, 18b.

According to some aspects, with reference to FIG. 10, the wireless communication arrangement further comprises:

An optional second controlling module X40 that is configured to control the upper threshold $t_U$ such that it exceeds the current radio rate capacity.

An optional third controlling module X41 that is configured to control the lower threshold $t_L$ such that it falls below the current radio rate capacity.

The present disclosure is not limited to the above, but may vary freely within the scope of the appended claims. For example, the nodes may be any kind of suitable devices that are arranged for transmission and/or reception. The indoor and outdoor units may be of any number at each such device, and are generally constituted by device parts such that the first device 2 comprises a first device first part 5 and at least one first device second part 6, 7, and the second device 3 comprises a second device first part 8 and at least one second device second part 9, 10. Each second part 6, 7; 9, 10 furthermore comprises a corresponding antenna arrangement 11, 12; 13, 14.

The wireless communication arrangement 1 may be a point to point mobile backhaul system, but any type of suitable wireless communication arrangement is conceivable, also including, but not limited to, systems intended for connecting business premises or data centers. The term Point to Point above shall not be interpreted as line of sight between the communicating devices as a prerequisite.

There are many ways to achieve the above features and functionalities, and each device 2, 3 may comprise any kind of suitable hardware, the hardware features disclosed is only an example, and as such only discloses those hardware features that are considered relevant for explaining the examples provided of the present disclosure. Many other features such as control units, power supplies etc. are of course necessary, but have been omitted for the sake of clarity, and their presence is obvious for the skilled person.

The segment overhead data such as the particular segment header/flag data in the examples discussed has been chosen in order to provide examples of how added segment header/flag data may be added, removed and restored. The segment overhead data such as segment header/flag data may be more or less than the examples discussed, and which segment header/flag data that should be added, removed and restored may of course vary depending on, for example, system requirements.

The wireless communication arrangement 1 may be comprised in a wireless communication system that comprises one or more wireless communication arrangements according to the above.

Generally, the present disclosure relates to a wireless communication arrangement 1 comprising a first device 2 and a second device 3 that are arranged to communicate with each other via a radio link 4, where the first device 2 comprises a first device first part 5 and at least one first device second part 6, 7, and the second device 3 comprises a second device first part 8 and at least one second device second part 9, 10, where each second part 6, 7; 9, 10 comprises a corresponding antenna arrangement 11, 12; 13, 14, and where a common radio interface 15a, 15b (CRI) constitutes a communication protocol for data streams between said first part 5, 8 and each of said second part 6, 7; 9, 10 for each device 2, 3, wherein the CRI 15a, 15b is arranged to support a segmentation of data frames 20, where formed data segments 21 each comprises at least a part of a data frame 20.

According to an example, said second device first part 8 comprises a data restoration unit 16 that is arranged to at least partly restore received data that is transmitted from at least one first device second part 6, 7 to at least two second device second parts 9, 10.

According to an example, the CRI 15a, 15b is arranged to support an initial addition of segment header/flag data 22, 23, 24a, 24b, 24c that comprises information regarding segment restoring, and an at least partial removal of said segment header/flag data 22, 23, 24a, 24b, 24c for at least a plurality of data segments 21 before transmission to at least one second device second part 9, 10.

According to an example, said at least partial removal of segment header/flag data comprises removal of sequential number data 22 and/or a segment end header 23 for at least two consecutive data segments 21, where each segment end header 23 is positioned after the rest of the segment data for a corresponding segment.

According to an example, removed sequential number data 24c is exchanged with sequential number difference data 25, and where the sequential number difference data 25 is removed while the sequential number difference is determined to be constant for at least two consecutive data segments 21.

According to an example, segment length data 24a is removed, and the segment end header 23 is removed if the sequence length of consecutive data segments 21 is determined to be constant.

According to an example, the CRI is arranged to support an at least partial restoring of the removed header/flag data 22, 23, 24a, 24b, 24c.

According to an example, the CRI is arranged to support segmentation of data frames 20 in dependence of estimated radio link rate capacity.

According to an example, at least one device 2, 3 comprises a second part 6, 7; 9, 10 that comprises a second part data stream buffer 18a, 18b; 47a, 47b, at least one first device second part 6, 7 is arranged to transmit data to at least one second device second part 9, 10 at a certain time $T_{C1}$ that is known to both said first device second part 6, 7 and said first device first part 5.

According to an example, at least one device 2 comprises a first part 5 that comprises a first part data stream buffer 17 and a second part data stream buffer 18a, 18b, where at least one control unit 19a, 19b is arranged to control the first part data stream buffer 17 to release data to said second part data stream buffer 18a, 18b at a rate that lies between an upper threshold $t_U$ and a lower threshold $t_L$ at said second part data stream buffer 18a, 18b.

According to an example, said control unit 19a, 19b is arranged to update the upper threshold $t_U$ and the lower threshold $t_L$ in dependence of current radio rate capacity.

According to an example, said control unit 19a, 19b is arranged to control the upper threshold $t_U$ such that it exceeds the current radio rate capacity, and to control the lower threshold $t_L$ such that it falls below the current radio rate capacity.

According to an example, the CRI 15a, 15b is arranged to control routing of data streams 21 to a desired first device second part 6, 7 in dependence of available radio link rate capacity.

According to an example, the first device 2 and the second device 3 have a reciprocal functionality.

According to an example, the first device 2 and the second device 3 are in the form of wireless communication nodes.

Generally, the present disclosure also relates to a method in a wireless communication arrangement 1 using a first device 2 and a second device 3 that are used to communicate with each other via a radio link 4, where the first device 2 uses a first device first part 5 and at least one first device second part 6, 7, and the second device 3 uses a second device first part 8 and at least one second device second part 9, 10, wherein the method comprises:

26: using a common radio interface 15 (CRI) that constitutes a communication protocol for data streams between said first part 5, 8 and each of said second part 6, 7; 9, 10 for each device 2, 3; and 27: performing segmentation of data frames 20, such that data segments 21 are formed, each data segment 21 comprising at least a part of a data frame 20.

According to an example, the method comprises

28: transmitting data from at least one first device second part 6, 7 to at least two second device second parts 9, 10; and 29: at least partly restoring received data.

According to an example, the method further comprises:

30: initially adding segment header/flag data 22, 23, 24a, 24b, 24c that comprises information regarding segment restoring, and 31: at least partially removing said segment header/flag data 22, 23, 24a, 24b, 24c for at least a plurality of data segments 21 before transmission to at least one second device second part 9, 10.

According to an example, the method further comprises:

32: at least partly restoring the removed header/flag data 22, 23, 24a, 24b, 24c.

According to an example, the step 31 of at least partially removing segment header/flag data comprises removing sequential number data 22 and/or a segment end header 23 for at least two consecutive data segments 21, where each segment end header 23 is positioned after the rest of the segment data for a corresponding segment.

According to an example, the method comprises:

33: exchanging removed sequential number data 24c with sequential number difference data 25, and 34: removing the sequential number difference data 25 while the sequential number difference is determined to be constant for at least two consecutive data segments 21.

According to an example, the step 31 of at least partially removing segment header/flag data comprises:

35: removing segment length data 24a; and

36: removing the segment end header 23 if the sequence length of consecutive data segments 21 is determined to be constant.

According to an example, segmentation of data frames 20 is performed in dependence of estimated radio link rate capacity.

According to an example, the method comprises transmitting data from at least one first device second part 6, 7 to at least one second device second part 9, 10 at a certain time $T_{C_1}$ that is known to both said first device second part 6, 7 and said first device first part 5.

According to an example, the method comprises:

37: using a first part data stream buffer 17 in at least one first part 5;

38: using a second part data stream buffer 18a, 18b in at least one second part 6, 7; and 39: controlling the first part data stream buffer 17 to release data to said second part data stream buffer 18a, 18b at a rate that lies between an upper threshold $t_U$ and a lower threshold $t_L$ at said second part data stream buffer 18a, 18b.

According to an example, the method comprises updating the upper threshold $t_U$ and the lower threshold $t_L$ in dependence of current radio capacity.

According to an example, the method comprises:

40: controlling the upper threshold $t_U$ such that it exceeds the current radio rate capacity; and 41: controlling the lower threshold $t_L$ such that it falls below the current radio rate capacity.

According to an example, the method comprises controlling routing of data streams 21 to a desired first device second part 6, 7 in dependence of available radio link rate capacity.

According to an example, the first device 2 and the second device 3 have a reciprocal functionality.

The invention claimed is:

1. A wireless communication arrangement for point to point mobile backhaul comprising:
   a first device and a second device that are arranged to communicate with each other via a radio link;
   wherein the first device comprises a first device first part that is part of a packet domain of the first device, and at least one first device second part that is part of a radio link domain of the first device;
   wherein the second device comprises a second device first part that is part of a packet domain of the second device, and at least one second device second part that is part of a radio link domain of the second device;
   wherein each second part comprises a corresponding antenna arrangement;
   wherein a common radio interface (CRI) constitutes a communication protocol for data streams between the first part and each of the second part for each device;
   wherein the CRI is configured to support a segmentation of data frames;
   wherein formed data segments each comprises at least a part of a data frame; and
   wherein at least one device comprises a first part that comprises a first part data stream buffer and a second part data stream buffer;
   wherein at least one control circuitry is configured to control the first part data stream buffer to release data to the second part data stream buffer at a rate that lies between an upper threshold and a lower threshold at the second part data stream buffer.

2. The wireless communication arrangement of claim 1, wherein the second device first part comprises a data restoration circuitry that is configured to at least partly restore received data that is transmitted from at least one first device second part to at least two second device second parts.

3. The wireless communication arrangement of claim 2, wherein the CRI is configured to support an initial addition of at least one of segment header data and/or segment flag data that comprises information regarding segment restoring, and an at least partial removal of at least one of the segment header data and/or segment flag data for at least a plurality of the data segments before transmission to at least one second device second part.

4. The wireless communication arrangement of claim 3, wherein the CRI is configured to support an at least partial restoring of at least one of the removed header data and/or segment flag data.

5. The wireless communication arrangement of claim 1, wherein the CRI is configured to support the segmentation of data frames in dependence of estimated radio link rate capacity.

6. The wireless communication arrangement of claim 1, wherein at least one device comprises a second part that comprises a second part data stream buffer, wherein at least one first device second part is configured to transmit data to at least one second device second part at a certain time that is known to both the at least one transmitting first device second part and the first device first part.

7. The wireless communication arrangement of claim 1, wherein the control circuitry is configured to update the upper threshold and the lower threshold in dependence of current radio rate capacity.

8. The wireless communication arrangement of claim 1, wherein the control circuitry is configured to:
   control the upper threshold such that the upper threshold exceeds current radio rate capacity; and control the lower threshold such that the lower threshold falls below the current radio rate capacity.

9. The wireless communication arrangement of claim 1, wherein the CRI is configured to control routing of data streams to a desired first device second part in dependence of available radio link rate capacity.

10. A method, in a wireless communication arrangement, for point to point mobile backhaul using a first device and a second device that communicate with each other via a radio link;
wherein the first device uses a first device first part and at least one first device second part;
wherein the second device uses a second device first part and at least one second device second part;
wherein the first parts are part of a packet domain of the first device and second device respectively;
wherein the second parts are part of a radio link domain of the first device and second device respectively;
wherein the method comprises:
using a common radio interface (CRI) that constitutes a communication protocol for data streams between the first part and each of the at least one second part for each device;
performing segmentation of data frames such that data segments are formed, each data segment comprising at least a part of a data frame;
using a first part data stream buffer in at least one first part;
using a second part data stream buffer in at least one second part; and
controlling the first part data stream buffer to release data to the second part data stream buffer at a rate that lies between an upper threshold and a lower threshold at the second part data stream buffer.

11. The method of claim 10, wherein the method comprises:
transmitting data from at least one first device second part to at least two second device second parts; and
at least partly restoring received data.

12. The method of claim 11, wherein the method comprises:
initially adding at least one of segment header data and/or segment flag data that comprises information regarding segment restoring; and
at least partially removing at least one of the segment header data and/or segment flag data for at least a plurality of the data segments before transmission to at least one second device second part.

13. The method of claim 12, wherein the method further comprises at least partly restoring at least one of the removed header data and/or segment flag data.

14. The method of claim 12, wherein the at least partially removing at least one of the segment header data and/or segment flag data comprises removing at least one of sequential number data and/or a segment end header for at least two consecutive data segments, where each segment end header is positioned after the rest of the segment data for a corresponding segment.

15. The method of claim 14, wherein the method comprises:
exchanging the removed sequential number data with sequential number difference data; and
removing the sequential number difference data while the sequential number difference is determined to be constant for at least two consecutive data segments.

16. The method of claim 12, wherein the at least partially removing at least one of the segment header data and/or segment flag data comprises:
removing segment length data; and
removing the segment end header when the sequence length of consecutive data segments is determined to be constant.

17. The method of claim 10, wherein segmentation of data frames is performed in dependence of estimated radio link rate capacity.

18. The method of claim 10, wherein the method comprises transmitting data from at least one first device second part to at least one second device second part at a certain time that is known to both the at least one transmitting first device second part and the first device first part.

19. The method of claim 10, wherein the method comprises updating the upper threshold and the lower threshold in dependence of current radio capacity.

20. The method of claim 10, wherein the method comprises:
controlling the upper threshold such that the upper threshold exceeds current radio rate capacity; and
controlling the lower threshold such that the lower threshold falls below the current radio rate capacity.

21. A wireless communication device for point to point mobile backhaul, wherein the device can communicate with at least one other device via a radio link, the device comprising:
an indoor part that is part of a packet domain of the device;
one or more outdoor parts that are part of a radio link domain of the device, wherein each of the one or more outdoor parts comprises a corresponding antenna arrangement;
a common radio interface (CRI) for the indoor parts and the one or more outdoor parts to constitute a communication protocol for data streams between the indoor part and the one or more outdoor parts, wherein:
the CRI is configured to support a segmentation of data frames, and
formed data segments each comprises at least part of one of the data frames
an indoor data stream buffer and an outdoor data stream buffer; and
at least one control circuitry that is configured to control the indoor data stream buffer to release data to the outdoor data stream buffer at a rate that lies between an upper threshold and a lower threshold at the outdoor data stream buffer.

22. The wireless device of claim 21, wherein the indoor part comprises a data restoration circuitry that is configured to at least partly restore data received by two or more outdoor parts.

23. The wireless device of claim 22, wherein the CRI is configured to support an initial addition of at least one of segment header data and/or segment flag data that comprises information regarding segment restoring, and an at least partial removal of at least one of the segment header data and/or segment flag data for at least a plurality of the data segments before transmission to at least one of the two or more outdoor parts.

24. The wireless device of claim 23, wherein the CRI is configured to support an at least partial restoring of at least one of the removed segment header data and/or segment flag data.

25. The wireless device of claim 21, wherein the CRI is configured to support segmentation of data frames in dependence of estimated radio link rate capacity.

26. The wireless device of claim 21, wherein the control circuitry is configured to update the upper threshold and the lower threshold in dependence of current radio rate capacity.

27. The wireless device of claim 21, wherein the control circuitry is further configured to:
   control the upper threshold such that the upper threshold exceeds current radio rate capacity; and
   control the lower threshold such that the lower threshold falls below the current radio rate capacity.

* * * * *